(12) United States Patent
Elboim et al.

(10) Patent No.: US 11,662,258 B2
(45) Date of Patent: May 30, 2023

(54) FORCE SENSOR INTEGRATED ON SUBSTRATE

(71) Applicant: Wiliot, LTD., Caesarea (IL)

(72) Inventors: Yaron Elboim, Haifa (IL); Eylon Gersten, Even Yehuda (IL)

(73) Assignee: WILIOT, LTD., Caesarea (IL)

( * ) Notice: Subject to any disclaimer, the term of this patent is extended or adjusted under 35 U.S.C. 154(b) by 277 days.

(21) Appl. No.: 16/774,437

(22) Filed: Jan. 28, 2020

(65) Prior Publication Data

US 2020/0378847 A1 Dec. 3, 2020

Related U.S. Application Data (60) Provisional application No. 62/854,028, filed on May 29, 2019.

(51) Int. Cl.
| | |
|---|---|
| *H04L 67/12* | (2022.01) |
| *G01L 1/22* | (2006.01) |
| *G01L 1/14* | (2006.01) |
| *G06K 7/10* | (2006.01) |

(52) U.S. Cl.
CPC ............ *G01L 1/2256* (2013.01); *G01L 1/144* (2013.01); *G06K 7/10356* (2013.01); *G06K 7/10366* (2013.01); *H04L 67/12* (2013.01)

(58) Field of Classification Search
CPC .... G06K 19/0707; G06K 19/00; G06K 19/06; G06K 19/067; G06K 19/07; G06K 19/0701; G06K 19/0708; G06K 19/0711; G06K 7/10356; G06K 7/10366; G06K 19/0723; G06K 19/0716; G06K 19/0724; B29C 70/78; B29K 2083/00; B29K 2105/20; B29L 2031/3481; G01L 1/2256; G01L 1/144; G01L 1/14; H04L 67/12

See application file for complete search history.

(56) References Cited

U.S. PATENT DOCUMENTS

| | | | |
|---|---|---|---|
| 7,891,253 | B2 | 2/2011 | Shipton |
| 9,261,787 | B1 * | 2/2016 | Lushington ............. G03F 7/091 |
| 2005/0146383 | A1 | 7/2005 | Moore et al. |
| 2006/0189863 | A1 * | 8/2006 | Peyser ................... A61B 5/742 |
| | | | 128/903 |
| 2008/0176046 | A1 * | 7/2008 | Yamaguchi ............. B81C 3/008 |
| | | | 156/247 |
| 2008/0250864 | A1 * | 10/2008 | Shipton .............. G01D 5/34746 |
| | | | 73/780 |
| 2010/0040191 | A1 * | 2/2010 | Ubarretxena Belandia ................ |
| | | | G01K 7/32 |
| | | | 377/25 |
| 2018/0059823 | A1 * | 3/2018 | Chang ................. G06F 3/04166 |

(Continued)

OTHER PUBLICATIONS

Damilano, et al., "Commercial Tactile Sensors for Hand Exoskeletons: Practical Considerations for Ultra-Low Cost and Very-Low Complexity Read-Out", IEEE Instrumentation & Measurement Magazine, 1094-6969, Oct. 2016, pp. 49-56.

*Primary Examiner* — Amine Benlagsir
*Assistant Examiner* — Anthony D Afrifa-Kyei
(74) *Attorney, Agent, or Firm* — M&B IP Analysts, LLC (57) ABSTRACT

A Internet of Things (IoT) tag for measuring transmitted force applied on the IoT tag, including a substrate, a force sensor integrated on the substrate, and a sensing circuit integrated on the substrate and configured to output a digital word measurement in response to an applied force on the force sensor.

2 Claims, 6 Drawing Sheets

(56) References Cited

U.S. PATENT DOCUMENTS

| | | | |
|---|---|---|---|
| 2018/0322376 A1* | 11/2018 | Henry | G08C 17/02 |
| 2018/0331865 A1* | 11/2018 | Ziv | H04L 27/12 |
| 2019/0383676 A1* | 12/2019 | Foughi | G01L 1/14 |
| 2020/0004995 A1* | 1/2020 | Kawaguchi | H04W 12/06 |
| 2020/0203532 A1* | 6/2020 | Yamazaki | H01L 29/66969 |
| 2021/0148836 A1* | 5/2021 | Hameed | A61B 5/0008 |

* cited by examiner

FORCE SENSOR INTEGRATED ON SUBSTRATE

CROSS-REFERENCE TO RELATED APPLICATIONS

This application claims the benefit of U.S. Provisional Application No. 62/854,028 filed on May 29, 2019, the contents of which are hereby incorporated by reference.

TECHNICAL FIELD

The present disclosure generally relates to Internet of things (IoT) tags, and in particular to integration of sensors in package less IoT tags.

BACKGROUND

The Internet of Things (IoT) is the inter-networking of physical devices, vehicles, buildings, and other items embedded with electronics, software, sensors, actuators, and network connectivity that enable these objects to collect and exchange data. IoT is expected to offer advanced connectivity of devices, systems, and services that go beyond machine-to-machine (M2M) communications and cover a variety of protocols, domains, and applications.

IoT can be encapsulated in a wide variety of devices such as: heart monitoring implants, biochip transponders on farm animals, automobiles with built-in sensors, automation of lighting, heating, ventilation, air conditioning (HVAC) systems, and appliances such as washer/dryers, robotic vacuums, air purifiers, ovens or refrigerators/freezers that use Wi-Fi for remote monitoring. Typically, IoT devices (or tags) encapsulate sensors configured to measure environment signals.

Most IoT tags are wireless devices that collect data and transmit such data to the cloud through a central controller or directly to the cloud. There are a few requirements to be met to allow widespread deployment of IoT tags. Such requirements include communication links, low energy consumption, low maintenance costs, and compact size.

A typical IoT tag is typically composed of at least two main discrete components: an Integrated Circuit (IC) or a System on a Chip (SoC) and a sensor. The IC carries the functions of powering the tag, receiving/transmitting wireless signals, and processing the receive/transmit signals. The sensor measures a physical property and converts to electric signals.

In a typical implementation, the sensor is connected outside of the IC, and therefore outside of the die of the SoC. A die is a small block of semiconductor material on which a given functional circuit is fabricated. Typically, ICs are produced in large batches on a single wafer of semiconductor material through processes such as photolithography. The wafer is cut ("diced") into many pieces, each containing one copy of the circuit. Each of these pieces is called a die.

Typically, the sensor is connected outside of the die due to their physical dimension and the fact that they are made of different materials. As such, the ICs and sensors cannot be fabricated as a whole part of the IC, using today's submicron fabrication technologies. For IoT tags this may be a significant limiting factor.

It would therefore be advantageous to provide a solution that would overcome the challenges noted above.

SUMMARY

A summary of several example embodiments of the disclosure follows. This summary is provided for the convenience of the reader to provide a basic understanding of such embodiments and does not wholly define the breadth of the disclosure. This summary is not an extensive overview of all contemplated embodiments and is intended to neither identify key or critical elements of all embodiments nor to delineate the scope of any or all aspects. Its sole purpose is to present some concepts of one or more embodiments in a simplified form as a prelude to the more detailed description that is presented later. For convenience, the term "some embodiments" or "certain embodiments" may be used herein to refer to a single embodiment or multiple embodiments of the disclosure.

Some embodiments disclosed herein include an Internet of Things (IoT) tag for measuring transmitted force applied on the IoT tag, including a substrate, a force sensor integrated on the substrate, and a sensing circuit integrated on the substrate and configured to output a digital word measurement in response to an applied force on the force sensor.

Some embodiments disclosed herein also include a force sensing device, the force sensing device including a substrate, and a sensor integrated on the substrate, the sensor including a plurality of layers having a sensing film layer, a conductive film layer, and a spacer between the sensing film layer and the conductive film layer.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 1:
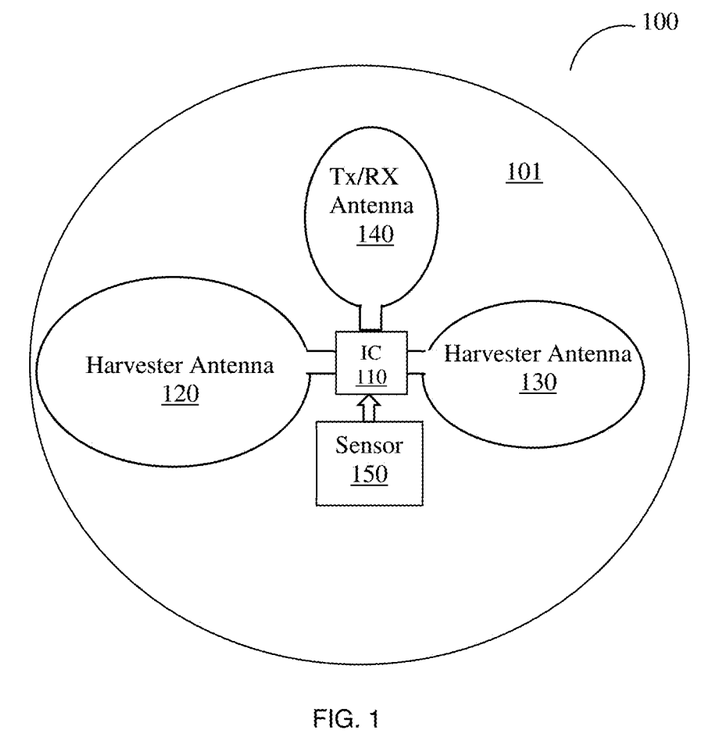
FIG. 1 a schematic diagram of an IoT tag structured with a force sensor for measuring transmitted force according to an embodiment.

FIG. 1 is a schematic diagram of an Internet of Things (IoT) tag (device) 100 structured according to an embodiment. The IoT tag 100 includes an Integrated Circuit (IC) 110 (chip) placed on a substrate 101. In an example embodiment, the substrate 101 also includes three loop antennas 120, 130, 140, configured as harvesting antennas (120, 130) and as a transmit antenna (140). Each of these antennas may be designed in a different shape of format. The antennas and the IC are fabricated on the same substrate 101.

Figure 5:
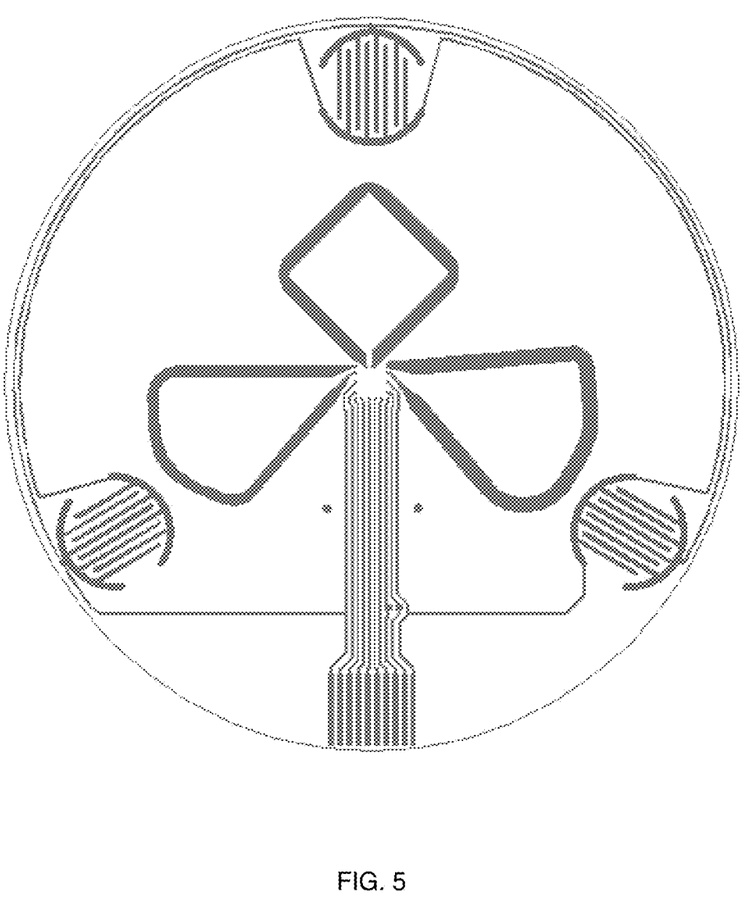
FIG. 5 is a layout of package-IoT tag according to an embodiment.

In an embodiment, the IoT tag 100 is utilized to transmit Bluetooth Low Energy (BLE) signals using the BLE tag through the transmit antenna 140 in the BLE frequency spectrum. The harvesting antennas 120 and 130 can harvest energy from wireless signals transmitted using commination protocols, such as Wi-Fi®, WiGig®, BLE, 3G cellular, LTE cellular, FM, and the like. The IoT tag 100 operates without a battery or any other external power source. The entire energy to power the IoT tag 100 is harvested from over-the-air signal. The form-factor of the IoT tag 100 is package-less. An example layout of package-less IoT tag is shown in FIG. 5.

According to an embodiment, a force sensor 150 for measuring measure transmitted force or pressure is also integrated in the IoT tag 100. The transmitted force or pressure is applied on the IoT tag 100. In an embodiment, the force sensor 150 is fabricated or printed on the substrate 101 on which the antennas 120, 130, and 140, as well as the IC 110 are fabricated. The force sensor 150 may be fabricated on one or more of the layers of the substrate 101.

In a typical IC fabrication process, once the semiconductor devices (e.g., transistors) are formed on the substrate, such devices are interconnected to form the desired electrical circuits. The interconnections are achieved using metal interconnecting layers (created on top of the substrate) that are isolated by dielectric layers.

According to one embodiment, the force sensor 150 may be realized as a Force Sensing Resistor (FSR) or a Force Sensing Capacitor (FSC). Where an FSR is used, the force sensor 150 reacts to the applied force by changing its resistance. In most cases, the FSR voltage drop is measured by using an analog to a digital convertor. This voltage drop level quantifies the force change.

The force sensor 150 may be placed on the IC 110 or around the IC 110, to save on space. The force sensor 150 may be part of the die including the IC 110. As noted above. A die is a small block of semiconductor material on which a given functional circuit is fabricated.

Figure 2:
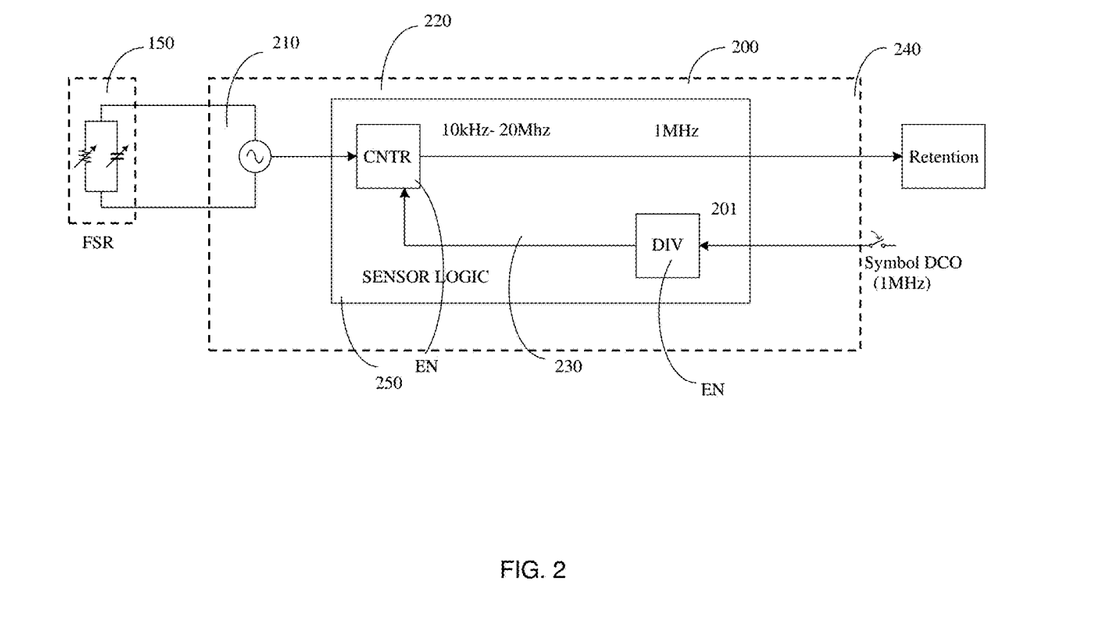
FIG. 2 is a diagram of a sensing circuit for measuring voltage drop of the force sensor according to an embodiment.

FIG. 2 shows an example diagram of a sensing circuit 200 for measuring voltage drop of the force sensor 150 according to an embodiment. The sensing circuit 200 includes an oscillating circuit 210, a counter 220, a flip-flop circuit 230, and a sensor logic 250. A memory, 240, such as a retention memory is also included. An example diagram of the oscillating circuit 210 is provided in FIG. 6.

According to an embodiment, the force sensor 150 may be embodied as an FSR, and can be modeled as a tunable resistor and capacitor arranged in parallel. Also, the force sensor 150 may be part of an oscillator tank (not shown) of the IC 110 that converts the measured resistance or capacitance changes to the corresponding force applied on the force sensor 150, as will be explained in more detail below, particularly with regard to descriptions corresponding to FIG. 6.

Within the sensor logic 250, frequency is determined from the pulse signals outputted from the oscillating circuit 210 via the counter 220, which also receives a counter clock supplied by the flip-flop circuit 230. That is, the output frequency pulses from the oscillating circuit 210 is counted by the counter 220. The determined frequency is then divided by the counter clock supplied by the flip-flop circuit 230. The flip-flop circuit 230 may be a D-type Flip-Flop, for example, which divides the input frequency by two to reduce the frequency of the input clock signal.

In operation, the sensing circuit 200 is part of the IC (e.g., IC 110) of the IoT tag 100, and as such is integrated on the substrate 101. The sensing circuit 200 outputs a digital measurement word. More specifically, within the sensing circuit 200, the frequency of the oscillating circuit 210 changes according to the force applied on the force sensor 150. The oscillating circuit's 210 frequency is measured by counting cycles with the digital counter 220. The counting window is then generated by dividing a reference clock supplied by the flip-flop circuit 230. The reference clock may be, for example, a 1 MHz symbol clock. The measured signal, or the digital word measurement, is then correlated with the applied force on the force sensor 150, and is stored on the memory 240, such as a retention memory.

Figure 3:
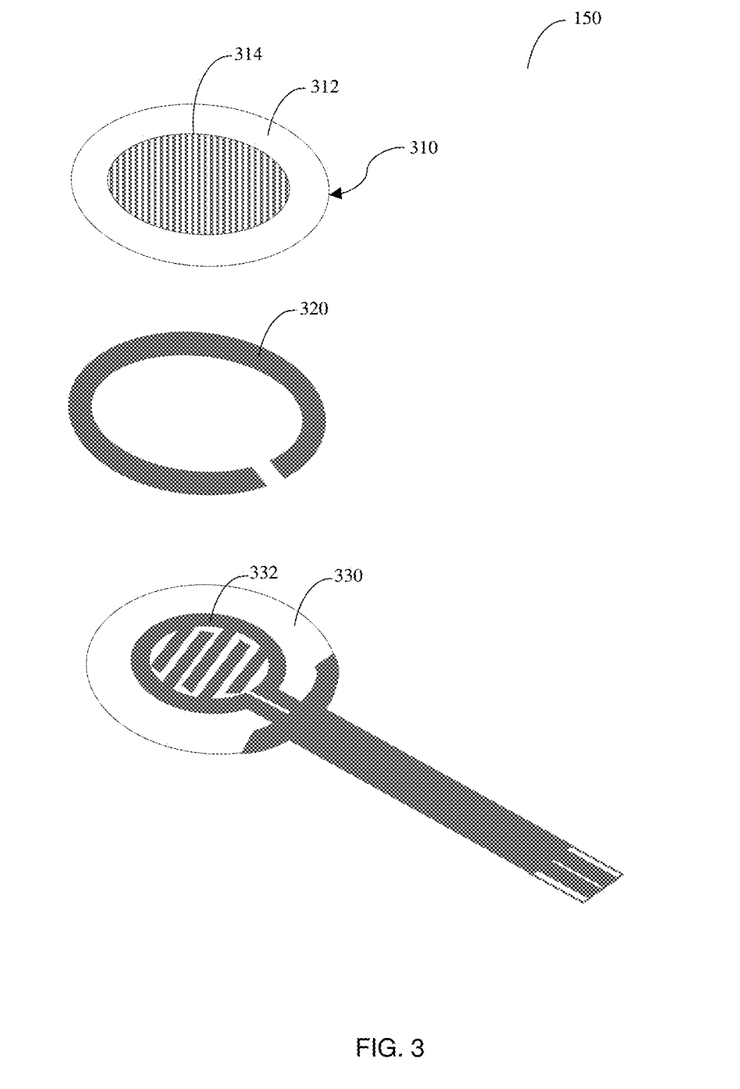
FIG. 3 is a schematic diagram of a force sensor.

FIG. 3 shows a schematic diagram of a force sensor 150. In an embodiment, the force sensor 150 may be implemented using the sensor's structure shown in FIG. 3. The main function of the force sensor 150 is to provide or otherwise measure an analog signal as a function of the force applied to a specific area of the force sensor 150. The analog signal is then analyzed by the sensing circuit 200 that output a digital measurement word respective of the applied force.

According to some embodiments, force sensor 150 may be an FSR or an FSC. As force is applied to the force sensor 150, the electrical resistance decreases, while the capacitance increases.

A typical implementation of the force sensor 150 (realized as FSR) includes three layers: a sensing layer 310, a spacer layer 320, and a conductive layer 330. The sensing layer 310 is a carbon-based sensing film, the spacer layer 320 is a spacer (plastic with or without adhesive), and the conductive layer 330 is a conductive film. The spacer layer 320 is arranged in-between the sensing layer 310 and the conductive layer 330. The force sensor 150 is supplied with a polymer sheet or ink, which may be applied by screen printing.

The sensing layer 310 has an outer ring 312 that surrounds an inner area 314. The sensing layer 310 also includes electrically conducting particles arranged on the inner area 314 of the sensing layer 310, and non-conducting particles that are present on the outer ring 312 of the sensing layer 310. The particles are generally sub-micrometer sizes, which are formulated for reducing the temperature dependence, for improving mechanical properties, and increasing surface durability.

The conductive layer 330 includes conducting electrodes 332 located towards an inner area of the conductive layer, which comes in contact with the inner area 314 of the sensing layer 310 when force is applied on the sensing layer 310.

That is, when force is applied to the surface of layer 310 (sensing film), conductive particles located on the inner area 314 of the sensing layer 310 contact the conducting electrodes 332 located in the layer 330, thus the resistance and capacitance of the conductive film (layer 330) changes. Specifically, the advantages of FSRs or FSCs are their size (thickness typically less than 0.5 mm), low cost, good shock resistance, and typically simple interface.

Figure 4:
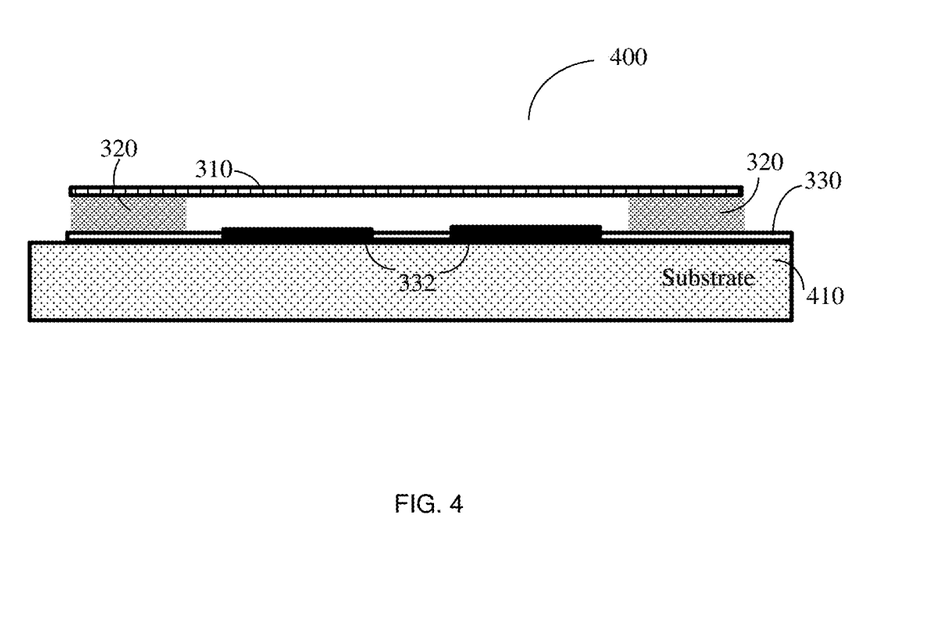
FIG. 4 is an example cross-section diagram of an IoT tag showing the formation of the force sensor according to an embodiment.

FIG. 4 shows an example cross-section diagram 400 illustrating the formation of the force sensor 150 on an IoT tag according to an embodiment. The IoT tag 100 is discussed with reference to FIG. 1, and example implementation of the force sensor 150 is discussed with reference to FIG. 3.

In an embodiment, the substrate 410 is a polyester film. In other embodiments, the substrate 410 may include Low Temperature Co-fired Ceramic (LTCC), Polyethylene Terephthalate (PET), paper, and the like.

The conductive layer 330 may be printed on the substrate 410 using conductive ink or nano-material ink, such as piezoresistive ink. The piezoresistive ink, characterized by a strong variation of the electrical capacitance and resistance upon mechanical deformation, allows for the implementation of force and stress sensors on different types of substrates.

In another embodiment, the conductive layer 330 may be formed using etched Aluminum, Copper, or any conductive material formed on the substrate 410. The antennas (120, 130, and 140, FIG. 1) and the connectivity between the force sensor 150 and external elements (e.g., test equipment, not show in FIG. 4) are made through the conductive layer 330.

A spacer layer 320 is mounted on top of the substrate 410 to separate between the conductive layer 330 and the sensing layer 310 being formed on top of the spacer layer 320. In an example embodiment, the sensing layer 310 is a carbon-based sensing film, and the spacer layer 320 is a plastic film that may be glued on opposite sides of the spacer layer 320 to both the sensing layer 310 and the conductive layer 330.

Figure 6:
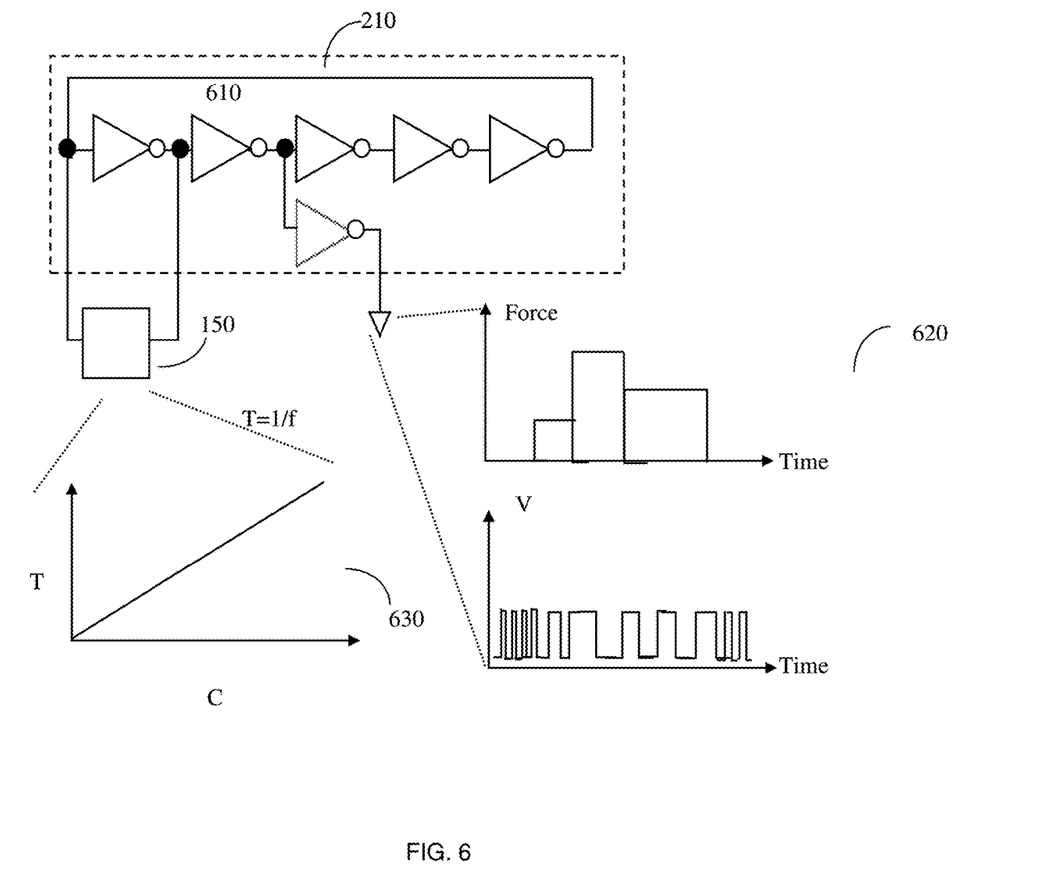
FIG. 6 is a detailed diagram of an oscillating measurement circuit utilized by the force sensor for deriving exerted force from frequency measurements, according to an embodiment.

FIG. 6 is a detailed diagram of an example diagram of the oscillating circuit 210 utilized with the force sensor 150 by the sensing logic 250 for deriving exerted force from frequency measurements, according to an embodiment. The oscillating circuit 210 is paired with the force sensor 150, and converts the measured capacitance to frequency. The oscillating circuit 210 may be a closed-loop ring oscillator with multiple inverters 610. As an example, five of the six inverters 610 are connected in a loop, with the remaining one of the inverters 610 serving as a buffer to rectify the output signal.

The force sensor 150 is connected across the first of the inverters 610, and may be modeled as a capacitance C and a resistance R connected in parallel.

The output signal of the oscillating circuit 210 is a square wave with a period (T=1/f). Also, the output frequency of the oscillating circuit 210 is correlated with the force exerted on the force sensor 150. As shown by the graph 620, the output frequency of the invertors 610 is at a maximum when no force is exerted. Also graph 630 shows that the output period T depends on the value of C measured by the force sensor 150. As force is exerted, it becomes longer to charge and discharge the increased capacitance. Therefore, as the C increases along with the exerted force, the output period T increases. Conversely, the switching frequency f among the inverters 610 decreases. By analyzing the relationships among the measured capacitance, the resulting effect on the output signal of the oscillating circuit 210, and the corresponding applied force on the force sensor 150, one may accurately measure the force applied using the force sensor 150.

As the sensor capacitance varies with the exerted force, the force sensor 150 and oscillating circuit 210 pair may serve as a low-cost, simple, low-power consumption piezoresistive transducer. Also, the outputted square wave period by the oscillating circuit 210 may easily be digitized with the counter (220), or it may be converted back to an analog signal by a period-to-voltage converter (not shown).

It is noted that the oscillating circuit 210 described above is merely an example of the oscillating circuit 210 utilized with the force sensor 150 for measuring frequency. However, other types of circuits may be utilized with the force sensor 150 to measure frequency that correspond with the force applied to the force sensor 150.

Overall, the system combines the low-cost and high repeatability of resistive sensors with the high sensitivity and low-power consumption of electronic interface for capacitive transducers.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to first and second elements does not mean that only two elements may be employed there or that the first element must precede the second element in some manner. Also, unless stated otherwise a set of elements comprises one or more elements. In addition, terminology of the form "at least one of A, B, or C" or "one or more of A, B, or C" or "at least one of the group consisting of A, B, and C" or "at least one of A, B, and C" used in the description or the claims means "A or B or C or any combination of these elements." For example, this terminology may include A, or B, or C, or A and B, or A and C, or A and B and C, or 2A, or 2B, or 2C, and so on.

All examples and conditional language recited herein are intended for pedagogical purposes to aid the reader in understanding the principles of the disclosed embodiments and the concepts contributed by the inventor to furthering the art, and are to be construed as being without limitation to such specifically recited examples and conditions. Moreover, all statements herein reciting principles, aspects, and embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

What is claimed is:

1. An Internet of Things (IoT) tag for measuring transmitted force applied on the IoT tag, comprising:
    a substrate;
    a force sensor integrated on the substrate;
    a plurality of antennas printed on the substrate, the plurality of antennas including at least a transmitter antenna connected to an integrated circuit (IC), and a harvester antenna connected to the integrated circuit; and
    a sensing circuit integrated on the substrate and configured to output a digital word measurement in response to an applied force on the force sensor, wherein the sensing circuit further comprises:
    an oscillating circuit; and
    a sensor logic configured to:
        determine a frequency from a pulse signal outputted from the oscillating circuit;
        correspond the determined frequency with the applied force; and
        compute the applied force based on the determined frequency,
    wherein the sensor logic is further configured to include a counter and a flip-flop circuit;
    wherein the force sensor comprises a sensing layer, a conductive layer, and a spacer layer between the sensing layer and the conductive layer;
        wherein the sensing layer comprises at least a film including conductive sub-micrometer sized particles, wherein the particles contact the conductive layer upon application of the force on the sensing layer;

wherein the conductive layer includes a metallic conductor and the metallic conductor comprises any one of conductive ink or nano-material ink that is printed on the substrate;

wherein the metallic conductor comprises conductive metallic material that is formed on the substrate by etching;

wherein the spacer layer comprises a plastic film;

wherein the oscillating circuit includes a ring oscillator having a plurality of inverters;

wherein the sensing circuit further comprises a memory to store the digital word measurement;

wherein the frequency is determined based on one of a resistance or a capacitance measured by the force sensor;

wherein the substrate comprises a polyester film;

wherein the force sensor is placed any of: on top of the IC or around the IC;

wherein the Integrated Circuit (IC) and the force sensor are included in a die; and wherein a form factor of the IoT tag is package-less.

2. A force sensing device comprising:

a substrate; and a sensor integrated on the substrate, the sensor comprises a sensing layer, a conductive layer, and a spacer between the sensing layer and the conductive layer, wherein the sensing layer comprises at least a film including sub-micrometer sized particles;

a sensing circuit integrated on the substrate and configured to output a digital word measurement in response to an applied force on the sensor, wherein the sensing circuit further comprises:

an oscillating circuit; and a sensor logic configured to:
   determine a frequency from a pulse signal outputted from the oscillating circuit;
   correspond the determined frequency with the applied force; and
   compute the applied force based on the determined frequency,
   wherein the sensor logic is further configured to include a counter and a flip-flop circuit;

wherein the sensing layer includes an outer ring surrounding an inner area;

wherein the particles include non-conductive particles arranged on the outer ring and conductive particles arranged on the inner area;

wherein the spacer is arranged along the outer ring;

wherein the conductive layer includes electrodes arranged within an inner area of the conductive layer; and wherein the conductive particles contact the conductive layer upon the application of the force on the sensing layer.

* * * * *